US010769281B2

(12) United States Patent
Hinton et al.

(10) Patent No.: US 10,769,281 B2
(45) Date of Patent: Sep. 8, 2020

(54) COMPLIANT SOFTWARE COMPONENT INFRASTRUCTURE DEPLOYMENT

(71) Applicant: INTERNATIONAL BUSINESS MACHINES CORPORATION, Armonk, NY (US)

(72) Inventors: Heather M. Hinton, Austin, TX (US); Prabhakar Attaluri, Aurora, IL (US); Michael J. McGuire, Beaumont Hills (AU)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/834,154

(22) Filed: Dec. 7, 2017

(65) Prior Publication Data
US 2019/0180034 A1 Jun. 13, 2019

(51) Int. Cl.
G06F 21/57 (2013.01)
G06F 8/60 (2018.01)

(52) U.S. Cl.
CPC .............. *G06F 21/577* (2013.01); *G06F 8/60* (2013.01); *G06F 2221/033* (2013.01)

(58) Field of Classification Search
None
See application file for complete search history.

(56) References Cited

U.S. PATENT DOCUMENTS

| 7,278,163 | B2 | 10/2007 | Banzhof et al. |
| 7,593,859 | B1 | 9/2009 | Owens et al. |
| 7,962,582 | B2 * | 6/2011 | Potti ....................... G06F 8/656 |
| | | | 709/220 |
| 9,189,619 | B2 * | 11/2015 | Banerjee ................. G06F 21/52 |
| 9,460,169 | B2 | 10/2016 | Hinton et al. |
| 9,578,066 | B1 | 2/2017 | Prafullchandra et al. |
| 2007/0143827 | A1 * | 6/2007 | Nicodemus ......... G06F 21/6218 |
| | | | 726/2 |

(Continued)

OTHER PUBLICATIONS

Amazon Web Services: Risk and Compliance White Paper; May 2017; 81 pages.

(Continued)

*Primary Examiner* — Farid Homayounmehr
*Assistant Examiner* — Olanrewaju J. Bucknor
(74) *Attorney, Agent, or Firm* — Schmeiser, Olsen & Watts; Michael P. O'Keefe (57) ABSTRACT

A method and system for improving deployment of a compliance cloud software component is provided. The method includes receiving application compliance requirements associated with operational requirements associated with hardware and software components. Original configuration files associated with a current hardware and software configuration for each hardware and software component are received and modified and configuration files associated with a modified hardware and software configuration for the hardware and software components are generated. A risk assessment with respect to the application compliance requirements is executed and a specified cloud infrastructure stack is enabled. A software application comprising the specified cloud infrastructure stack is generated, deployed, and executed resulting in operation of the hardware and software components.

20 Claims, 8 Drawing Sheets

(56) References Cited

U.S. PATENT DOCUMENTS

| | | | | |
|---|---|---|---|---|
| 2013/0247136 | A1* | 9/2013 | Chieu | G06F 21/577 |
| | | | | 726/1 |
| 2014/0149492 | A1* | 5/2014 | Ananthanarayanan | ...................... |
| | | | | G06F 9/5072 |
| | | | | 709/203 |
| 2014/0149591 | A1* | 5/2014 | Bhattacharya | H04L 67/1097 |
| | | | | 709/226 |
| 2014/0281511 | A1* | 9/2014 | Kaushik | H04L 63/045 |
| | | | | 713/164 |
| 2015/0356000 | A1* | 12/2015 | Giammaria | H04L 63/00 |
| | | | | 717/127 |
| 2016/0139902 | A1 | 5/2016 | Dimitrakos et al. | |
| 2016/0147522 | A1* | 5/2016 | Dimitrakos | G06F 8/61 |
| | | | | 717/174 |
| 2018/0020019 | A1* | 1/2018 | Rieke | H04L 63/1433 |
| 2019/0311125 | A1* | 10/2019 | Mulgaonkar | G06F 9/4406 |

OTHER PUBLICATIONS

Deloitte; Cloud Computing—What Auditors need to know; 2016; 46 pages.

Anonymous; Method and System for Privacy Preserving and Audit Compliant reporting and Analysis of Individual Actions in Managed Cloud Environments; IP.com; IPCOM00024899D; Jan. 25, 2017; 4 pages.

Anonymous; Method and system for policy based security and compliance management for cloud environments; IP.com; IPCOM000220537D; Aug. 6, 2012; 10 pages.

\* cited by examiner

COMPLIANT SOFTWARE COMPONENT INFRASTRUCTURE DEPLOYMENT

FIELD

The present invention relates generally to a method for deploying cloud software components and in particular to a method and associated system for improving cloud infrastructure stack deployment technology by reconfiguring or modifying hardware and software components of a cloud infrastructure.

BACKGROUND

Cloud technology environments typically lack transparency between different component layers within a cloud infrastructure. Compliance and security issues may arise during deployment and execution of cloud related systems. Accordingly, there exists a need in the art to overcome at least some of the deficiencies and limitations described herein above.

SUMMARY

In one embodiment, the present invention provides a compliance cloud software component deployment improvement method comprising: receiving from hardware machine sources, by a processor of a compliance framework, application compliance requirements associated with operational requirements associated with hardware and software components; receiving, by the processor from the hardware and software components, original configuration files associated with a current hardware and software configuration for each hardware and software component of the hardware and software components; generating, by the processor based on the application compliance requirements with respect to the original configuration files, modified configuration files associated with a modified hardware and software configuration for each the hardware and software component; executing, by the processor, a risk assessment with respect to the application compliance requirements, the risk assessment associated with applying the modified configuration files to each the hardware and software component; enabling, by the processor based on results of the executing, a specified cloud infrastructure stack comprising a group of software components associated with executing the application compliance requirements within a specified operational risk threshold of the risk assessment; generating, by the processor, a software application comprising the specified cloud infrastructure stack; deploying, by the processor to the hardware and software components, the software application; and executing, by the processor, the software application resulting in operation of the hardware and software components.

In another embodiment, the present invention provides a computer program product, comprising a computer readable hardware storage device storing a computer readable program code, the computer readable program code comprising an algorithm that when executed by a processor of a compliance framework implements a compliance cloud software component deployment improvement method, the method comprising: receiving from hardware machine sources, by the processor, application compliance requirements associated with operational requirements associated with hardware and software components; receiving, by the processor from the hardware and software components, original configuration files associated with a current hardware and software configuration for each hardware and software component of the hardware and software components; generating, by the processor based on the application compliance requirements with respect to the original configuration files, modified configuration files associated with a modified hardware and software configuration for each the hardware and software component; executing, by the processor, a risk assessment with respect to the application compliance requirements, the risk assessment associated with applying the modified configuration files to each the hardware and software component; enabling, by the processor based on results of the executing, a specified cloud infrastructure stack comprising a group of software components associated with executing the application compliance requirements within a specified operational risk threshold of the risk assessment; generating, by the processor, a software application comprising the specified cloud infrastructure stack; deploying, by the processor to the hardware and software components, the software application; and executing, by the processor, the software application resulting in operation of the hardware and software components.

In another embodiment, the present invention provides compliance framework comprising a processor coupled to a computer-readable memory unit, the memory unit comprising instructions that when executed by the processor implements a compliance cloud software component deployment improvement method comprising: receiving from hardware machine sources, by the processor, application compliance requirements associated with operational requirements associated with hardware and software components; receiving, by the processor from the hardware and software components, original configuration files associated with a current hardware and software configuration for each hardware and software component of the hardware and software components; generating, by the processor based on the application compliance requirements with respect to the original configuration files, modified configuration files associated with a modified hardware and software configuration for each the hardware and software component; executing, by the processor, a risk assessment with respect to the application compliance requirements, the risk assessment associated with applying the modified configuration files to each the hardware and software component; enabling, by the processor based on results of the executing, a specified cloud infrastructure stack comprising a group of software components associated with executing the application compliance requirements within a specified operational risk threshold of the risk assessment; generating, by the processor, a software application comprising the specified cloud infrastructure stack; deploying, by the processor to the hardware and software components, the software application; and executing, by the processor, the software application resulting in operation of the hardware and software components.

The present invention advantageously provides a simple method and associated system capable of managing compliance and security issues arising during deployment and execution of cloud related systems.

DETAILED DESCRIPTION

Figure 1:
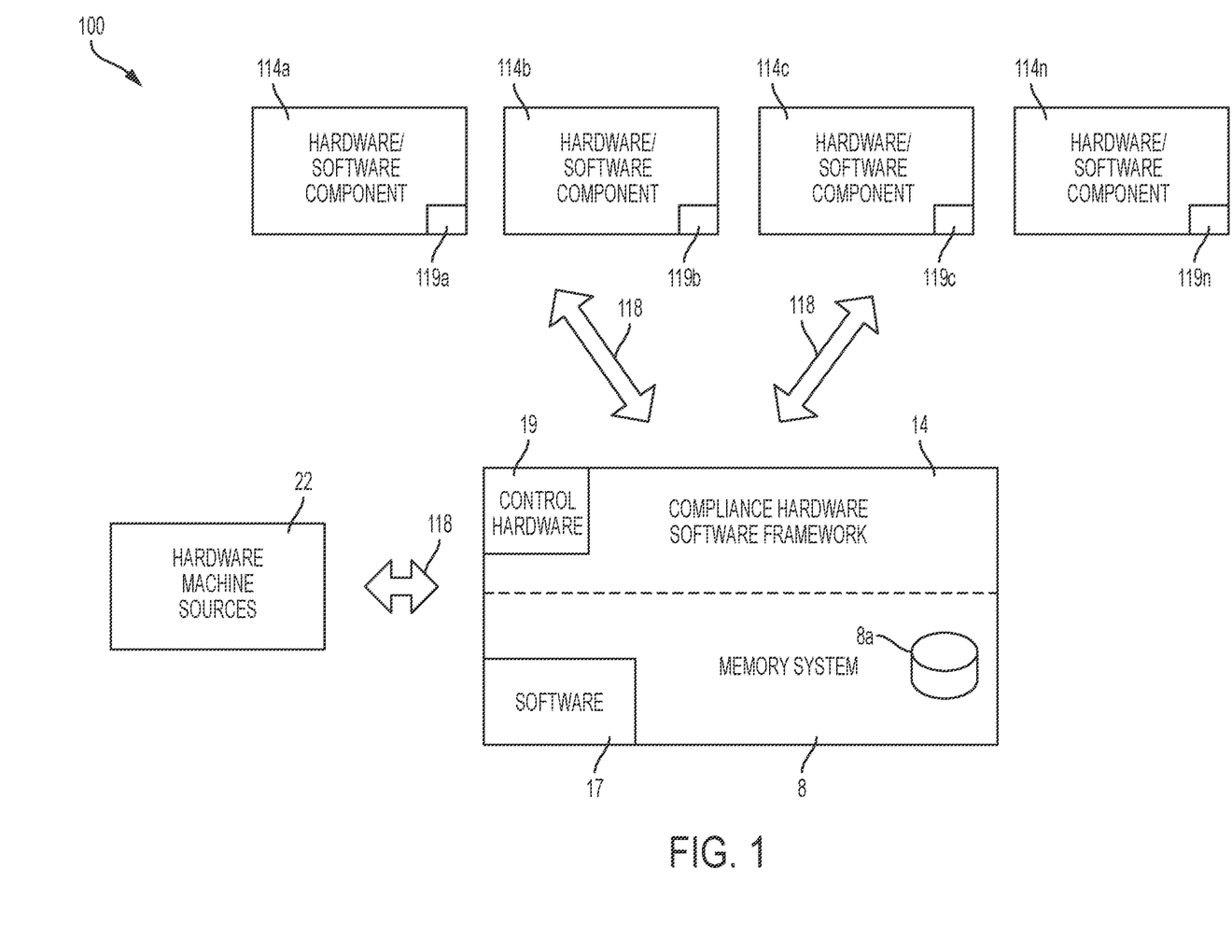
FIG. 1 illustrates a system for reconfiguring or modifying hardware and software components of a cloud infrastructure stack, in accordance with embodiments of the present invention.

FIG. 1 illustrates a system 100 for reconfiguring or modifying hardware and software components 114a . . . 114n of a cloud infrastructure stack, in accordance with embodiments of the present invention. System 100 enables a process for providing a cloud infrastructure stack associated with component compliance requirements within a risk threshold with respect to, inter alia, PCI, HIPAA, ISO27001, FISMA, IRAP, etc. A cloud infrastructure stack is defined herein as a group of software components for creating, managing, and deploying cloud infrastructure services. System 100 retrieves manually gathered data in combination with data from machine sources (e.g., hardware/software machine sources 22 in FIG. 1). For example, data from machine sources may include, inter alia, configuration files, system logs, and data sheets associated with hardware/software components associated with an assessment process and compliance requirements. The following process may be executed by system 100 of FIG. 1:

Application compliance requirements (comprising structured or unstructured data) are received by compliance hardware/software framework 14. The application compliance requirements are mapped to specific standards controls (e.g., specific ISO requirements) via execution of a natural language processing (NLP) application. A cloud infrastructure stack associated with the application compliance requirements is generated and executed. Alternatively, an initial cloud infrastructure stack may be analyzed to determine if it will meet application compliance requirements within a specified risk threshold. If initial cloud infrastructure stack is not determined to meet application compliance requirements within a specified risk threshold, modifications to the initial cloud infrastructure stack may be implemented. Additionally, various compliance requirements may be weighted to guarantee that specified critical operational requirements are met.

System 100 of FIG. 1 includes hardware/software components 114a . . . 114n and hardware machine sources 22 in communication with a compliance hardware/software framework 14 via a network 118. Hardware/software components 114a . . . 114n, hardware machine sources 22, and compliance hardware/software framework 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware/software components 114a . . . 114n, hardware machine sources 22, and compliance hardware/software framework 14 may each comprise a specialized hardware device(s) comprising specialized (non-generic) hardware and circuitry (i.e., specialized discrete non-generic analog, digital, and logic based circuitry) for executing a process described with respect to FIGS. 1-6. The specialized discrete non-generic analog, digital, and logic based circuitry may include proprietary specially designed components (e.g., a specialized integrated circuit such as an application specific integrated circuit (ASIC) designed for only implementing an automated process for reconfiguring or modifying hardware and software components of a cloud infrastructure stack. Hardware/software components 114a . . . 114n comprise control hardware/sensor devices 119a . . . 119n (e.g., specialized circuitry, optical sensors, voltage sensors, temperature sensors, etc.) for implementing an automated process for reconfiguring or modifying hardware and software components of a cloud infrastructure stack. Compliance hardware/software framework 14 includes a memory system 8 (including a data store 8a), software 17, and control hardware 19 (all sensors, interfaces, and associated control hardware for enabling software 17 to communicate with hardware/software components 114a . . . 114n and execute a process for implementing an automated process for reconfiguring or modifying hardware and software components of a cloud infrastructure stack). The memory system 8 may include a single memory system. Alternatively, the memory system 8 may include a plurality of memory systems. Hardware/software components 114a . . . 114n may comprise any type of hardware devices (comprising embedded circuitry for only performing an automated process for reconfiguring or modifying hardware and software components of a cloud infrastructure stack).

System 100 of FIG. 1 enables a process for retrieving data from computer configuration files, hardware/software system logs, and data sheets associated with hardware/software components associated with an operational assessment process. The data is generated based on measurements of hardware and software components of system 100. The data is combined with requirements for a specified type of component operational compliance to:

1. Determine if a specific combination of hardware or software components (of a cloud infrastructure stack) will satisfy a specified operational workload and compliance requirement. If the specific combination of hardware or software components will not satisfy a specified operational workload and compliance requirement, additional hardware or components may be added to the cloud infrastructure stack thereby satisfying the specified operational workload and compliance requirement.
2. Generate a list of required hardware and software components and associated configurations for deployment of a cloud environment for operational functionality.

System 100 executes data acquisition software via an application programming interface (API) for ingesting existing reports (e.g., a SOC2 Type 2 audit report, a product or offering's data sheet listing basic features such as log retention timelines, encryption keys, and the dependent key products required to support BYOK). Additionally, the data acquisition software retrieves existing data from a cloud based environment configuration (e.g., IaaS and PaaS components) including audit logs (for events such as, inter alia, computer login events, computer logout events, password reset events, etc.) for providing operational insight into implemented hardware/software controls and associated enforcement policies.

System 100 executes a post calculation software action associated with computer autonomous functions. Based on results of the post calculation software action, a proposed set of hardware or software components may be identified such that the components will meet a given compliance requirement. Additionally, additional components may be identified such that the additional components are configured to close any required gaps (e.g., an environment proposed for initial assessment requires customer managed encryption keys but does not include a key management component and where the assessment determines that a component X requires a cloud side key management utility) and build a list of the required components.

In response to results of the post calculation software action, a user is prompted to accept an initial proposed set of hardware and software components (comprising gaps) for deployment. Alternatively, a user may be prompted to deploy a proposed set of hardware and software components (including additional components/configurations identified via software for filling the gaps in the initial proposed set of hardware and software components).

Input layers (e.g., inputs such as, inter alia, IaaS, PaaS-Db, SaaS, etc.) based on customer selected results may be generated and deployed based on a result of the aforementioned calculations. Additional controls and software tools be added to the hardware and software components to allow a given workload (e.g., data encryption software mat be added to allow support for a HIPAA workload, an external firewall may be added to allow support for a PCI workload, etc.)

Additionally, a calculation and post calculation action may be executed to evaluate a customer's environment (e.g., using customers policy doc, audit reports, configuration logs, audit logs, etc.) with respect to composing with lower layer evidence to determine a point in time evaluation of a hardware and software environment/workload adherence to given workload regulatory requirements (e.g., HIPAA, PCI, etc.). In response, recommendations for additional controls to be added and operational reviews to be conducted may be generated.

Based on a selected list, an orchestration software layer is used to deploy and configure hardware and software resources in question to build a cloud environment that may host a given workload that may require specific regulatory requirements. If a user determines that the cloud environment will host both sensitive data and healthcare related data, a re-assessment may be executed with respect to the hardware and software deployed environment. In this case, initial data protection requirements may have been enabled with self-encrypting disks, but an assessment determines that in the new hardware and software deployed environment customer managed keys are required and that a stream editor (SED) in place does not support customer managed keys. In this case, the software tool will propose additional hardware and software components allowing an extension of the cloud environment. For example, a software tool may determine that all data is stored in an object data store environment and that the object data store environment requires updates to allow customer provided decryption keys to be included as part of the cloud environment.

The aforementioned software tools will provide an updated byte order mark (BoM) identifying additional hardware and software components and configurations required to support new compliance requirements. If the additional hardware and software components and configurations are accepted by a user, the additional hardware and software components are deployed to an existing cloud environment for usage with the user's new regulatory requirements.

Figure 2A:
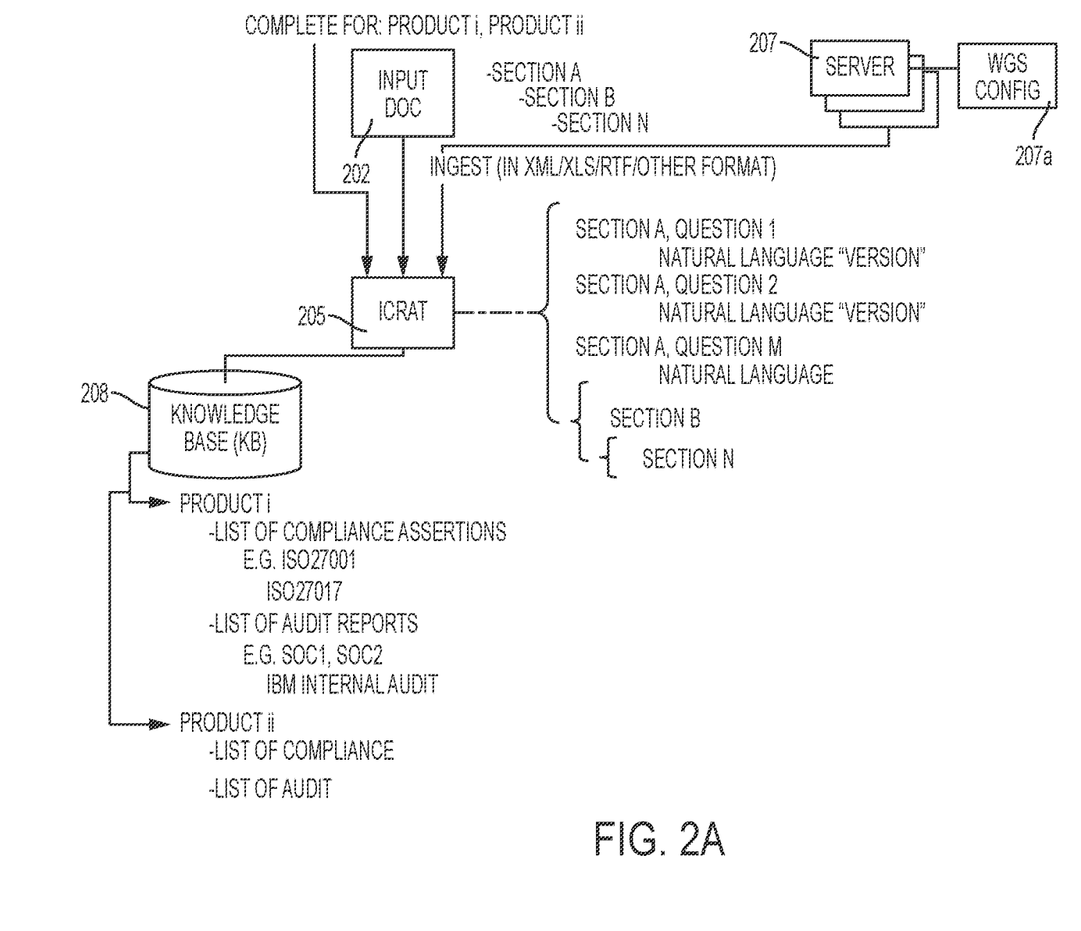
FIGS. 2A-2C illustrate a detailed view of an action generation process executed by an intelligent cloud risk assessment (software) tool executed by the compliance hardware/software framework of FIG. 1, in accordance with embodiments of the present invention.
Figure 2B:
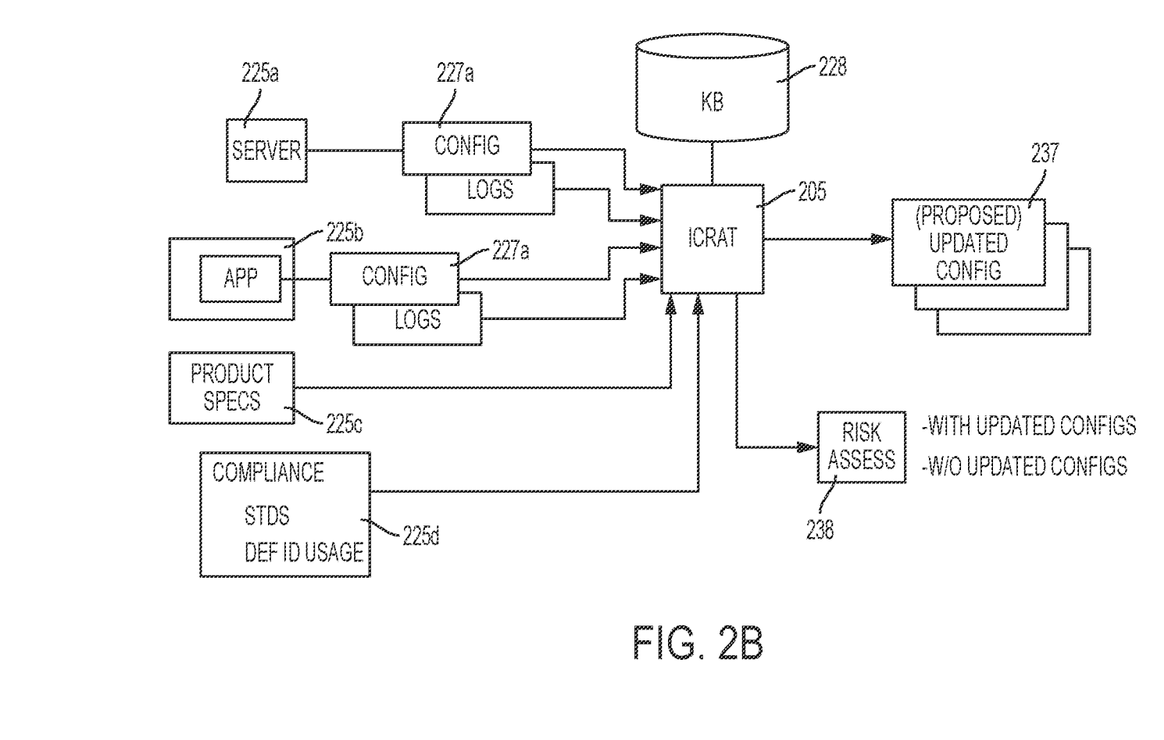
Figure 2C:
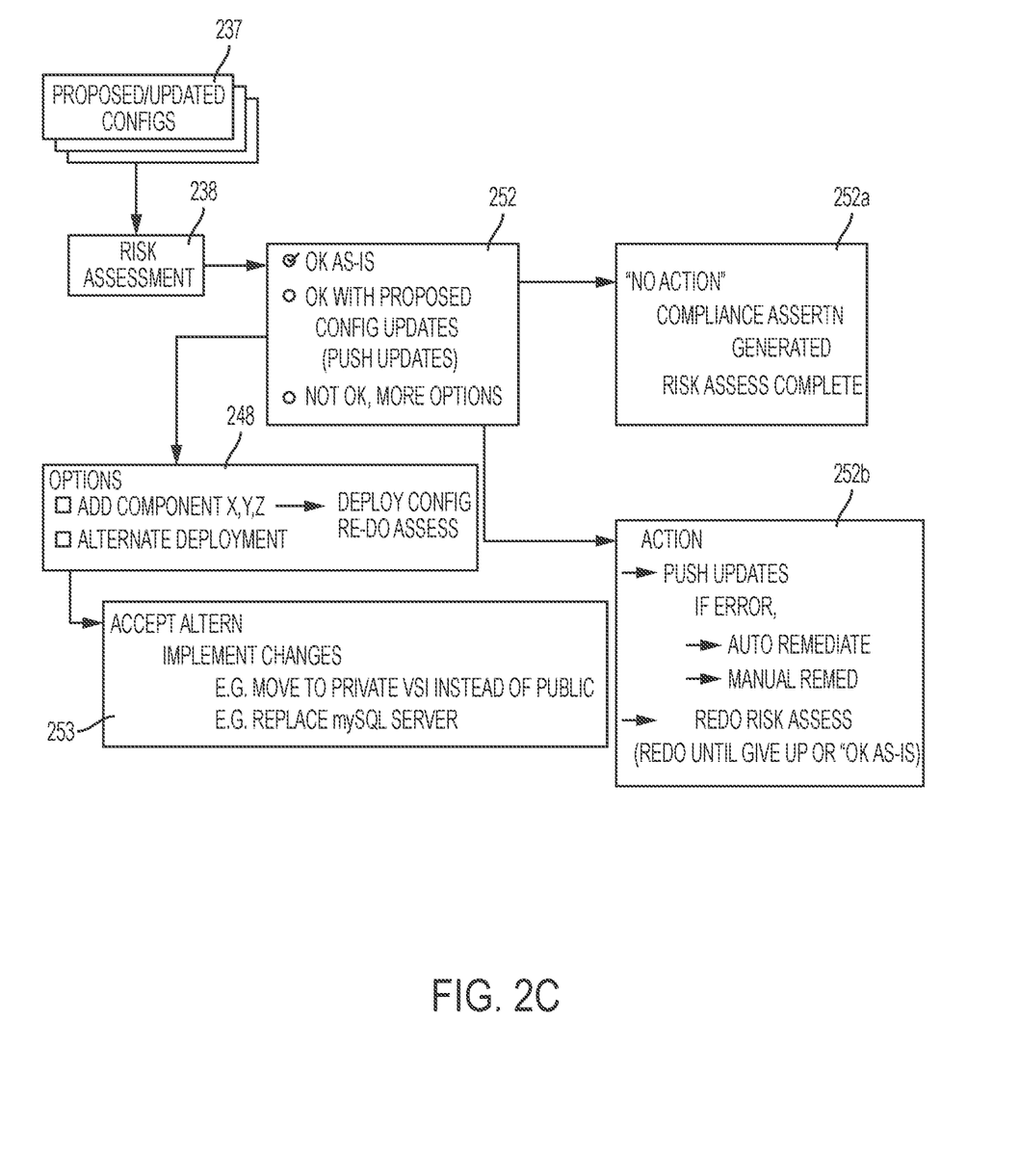

The aforementioned software tools may additionally be executed to analyze an existing cloud environment (by providing the set of hardware and components used in the existing cloud environment as inputs to the software tools) to perform a gap analysis requirements for bringing the cloud environment up to different levels of compliance. Alternatively, the aforementioned software tools may executed to assess a risk to the user if they already hosted regulated data in a cloud environment that is believed to have not met required regulatory controls.be FIG. 2, including FIGS. 2A-2C, illustrates a detailed view of an action generation process executed by an intelligent cloud risk assessment (software) tool (ICRAT) 205 executed by compliance hardware/software framework 14 of FIG. 1, in accordance with embodiments of the present invention. FIG. 2A illustrates ICRAT 205 automatically managing hardware/software components 114a . . . 114n (of FIG. 1) thereby providing an improvement to framework component deployment technology.

In step 202, an input document 202 comprising component product information is divided into sections is retrieved by ICRAT 205. Additionally, a log of configurations 207a is retrieved (by ICRAT 205) from a server 207. The log of configurations 207a may comprise any format such as, inter alia, XML, XLS, RTF, etc. The component product information sections may be divided via computer language preferences. The component product information sections are stored within a knowledge database 208 with respect to a format 211.

FIG. 2B illustrates ICRAT 205 retrieving configuration logs 227a and 227b (associated with hardware and software components) from a server 225a and an application 225b, respectively. Additionally, ICRAT 205 retrieves product specifications 225c, compliance information 225d (associated with hardware and software components), and additional hardware and software related information from a database 228. ICRAT 205 analyzes the retrieved data and generates proposed updated hardware and software configurations 237 and a risk assessment 238 associated with applying the updated hardware and software configurations 237.

FIG. 2C illustrates application of the proposed updated hardware and software configurations 237 and risk assessment 238. In step 252, options for applying the updated hardware and software configurations 237 are presented with resulting actions 252a and 252b. Additionally, component addition options 248 are presented with resulting implementations 253.

Figure 3:
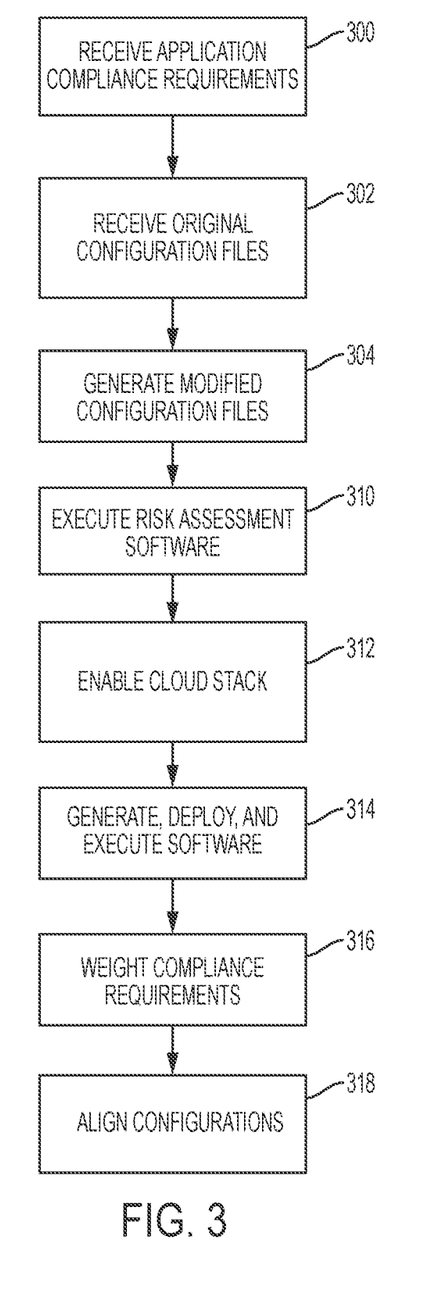
FIG. 3 illustrates an algorithm detailing a process flow enabled by the system of FIG. 1 for reconfiguring or modifying hardware and software components of a cloud infrastructure stack, in accordance with embodiments of the present invention.

FIG. 3 illustrates an algorithm detailing a process flow enabled by system 100 of FIG. 1 for reconfiguring or modifying hardware and software components of a cloud infrastructure stack, in accordance with embodiments of the present invention. Each of the steps in the algorithm of FIG. 3 may be enabled and executed in any order by a computer processor(s) or any type of specialized hardware executing computer code. In step 300, application compliance requirements are received (from hardware machine sources, such as, inter alia, hardware devices generating system software such as software/hardware system configuration files, hardware/software system log files, software/hardware system data files, etc.) by a compliance framework hardware software system (e.g., a cloud environment system). The application compliance requirements are associated with operational requirements associated with hardware and software components. The operational requirements are comprised by structured or unstructured data files. In step 302, original configuration files associated with a current hardware and software configuration for each hardware and software component are received from the hardware and software components. In step 304, modified configuration files are generated based on the application compliance requirements with respect to the original configuration files. The modified configuration files are associated with a modified hardware and software configuration for each hardware and software component. In step 310, a risk assessment is executed with respect to the application compliance requirements. The risk assessment is associated with applying the modified configuration files to each hardware and software component. In step 312, a specified cloud infrastructure stack is enabled based on results of step 310. The specified cloud infrastructure stack includes a group of software components associated with executing the application compliance requirements within a specified operational risk threshold of the risk assessment. In one embodiment, the specified cloud infrastructure stack includes a modified cloud infrastructure stack associated with the hardware and software components and the enabling process includes applying the modified configuration files to each hardware and software component; and updating each hardware and software component in accordance with the modified configuration files. In another embodiment, the specified cloud infrastructure stack includes an original cloud infrastructure stack associated with the hardware and software components and enabling the software application including the specified cloud infrastructure stack includes reconfiguring each hardware and software component in accordance with the original configuration files. In step 314, a software application the specified cloud infrastructure stack is generated, deployed, and executed. In step 316, the application compliance requirements are weighted such that specified critical requirements of the application compliance requirements are continuously executed within the software application. In step 318, a configuration of the software application is aligned with the application compliance requirements.

Figure 4:
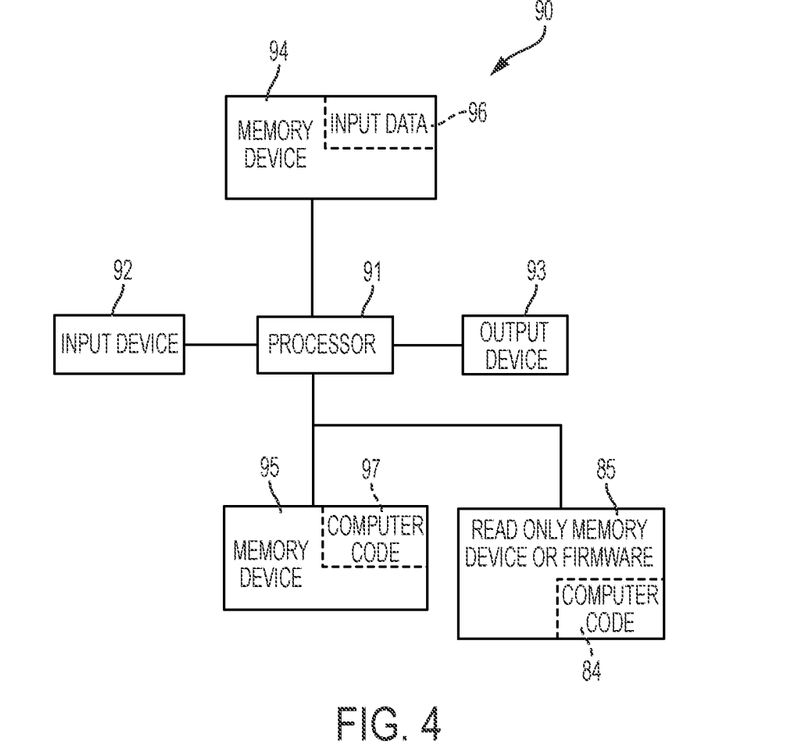
FIG. 4 illustrates a computer system used by the system of FIG. 1 for enabling a process for reconfiguring or modifying hardware and software components of a cloud infrastructure stack, in accordance with embodiments of the present invention.

FIG. 4 illustrates a computer system 90 (e.g., hardware/software components 114a . . . 114n and compliance hardware/software framework 14) used by or comprised by the system of FIG. 1 for reconfiguring or modifying hardware and software components of a cloud infrastructure stack, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3) for enabling a process for reconfiguring or modifying hardware and software components of a cloud infrastructure stack. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithms of FIGS. 2-3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for deploying a dynamic security deployment environment for reconfiguring or modifying hardware and software components of a cloud infrastructure stack. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for reconfiguring or modifying hardware and software components of a cloud infrastructure stack. In another embodiment, the invention provides a business method that performs the process steps of the invention on a subscription, advertising, and/or fee basis. That is, a service supplier, such as a Solution Integrator, could offer to enable a process for reconfiguring or modifying hardware and software components of a cloud infrastructure stack. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
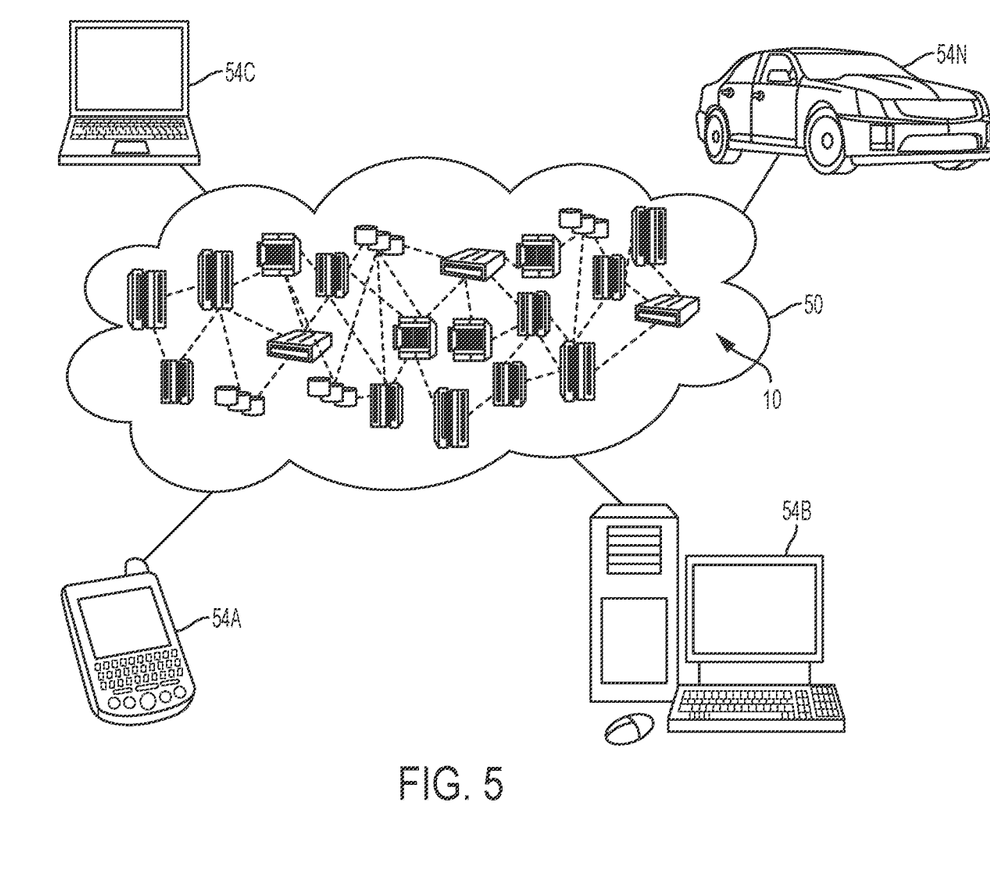
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
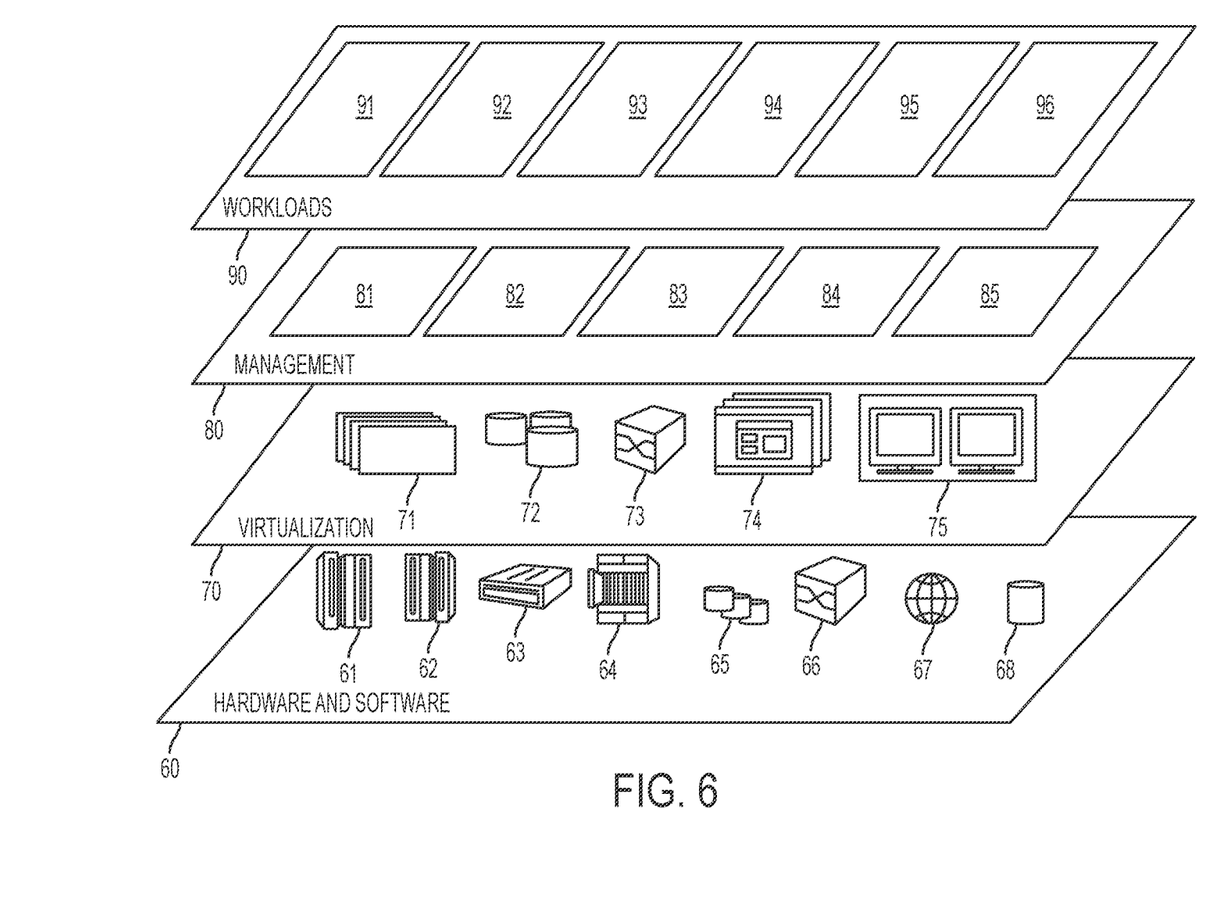
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reconfiguring or modifying hardware and software components of a cloud infrastructure stack 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A compliance cloud software component deployment improvement method comprising:
    receiving from hardware machine sources, by a processor of a compliance framework, application compliance requirements associated with operational requirements associated with hardware and software components, wherein said application compliance requirements comprise encryption keys and audit logs associated with implemented hardware and software controls for said hardware and software components;
    receiving, by said processor from said hardware and software components, original configuration files associated with a current hardware and software configuration for each hardware and software component of said hardware and software components, wherein said original configuration files are generated based on measurements of said hardware and software components;
    generating, by said processor based on said application compliance requirements with respect to said original configuration files, modified configuration files associated with a modified hardware and software configuration for each said hardware and software component;
    executing, by said processor, a risk assessment with respect to said application compliance requirements, said risk assessment associated with applying said modified configuration files to each said hardware and software component;
    evaluating, by said processor, a workload of each said hardware and software component at a specified point in time with respect to regulatory requirements;
    enabling, by said processor based on results of said executing and said evaluating, a specified cloud infrastructure stack comprising a group of software components associated with executing said application compliance requirements within a specified operational risk threshold of said risk assessment;
    generating, by said processor, a software application comprising said specified cloud infrastructure stack;
    deploying, by said processor to said hardware and software components, said software application, data encryption software, and an external firewall;
    executing, by said processor, said software application, said data encryption software, and said external firewall resulting in execution of decryption keys enabling operation of said hardware and software components;
    executing, by said processor, a gap analysis with respect to said operation of said hardware and software components; and
    enabling, by said processor based on results of said executing said gap analysis, said specified cloud infrastructure stack with respect to a specified level of compliance.

2. The method of claim 1, wherein said specified cloud infrastructure stack comprises a modified cloud infrastructure stack associated with said hardware and software components, and wherein said executing said data encryption software, said external firewall, and said software application comprising said specified cloud infrastructure stack comprises:
    applying said modified configuration files to each said hardware and software component; and
    updating each said hardware and software component in accordance with said modified configuration files.

3. The method of claim 1, wherein said specified cloud infrastructure stack comprises an original cloud infrastructure stack associated with said hardware and software components, and wherein said executing said data encryption software, said external firewall, and said software application comprising said specified cloud infrastructure stack comprises:
    reconfiguring each said hardware and software component in accordance with said original configuration files.

4. The method of claim 1, further comprising:
    weighting, by said processor, said application compliance requirements such that specified critical requirements of said application compliance requirements are continuously executed within said software application.

5. The method of claim 1, wherein said hardware machine sources comprise hardware devices generating system software selected from the group consisting of software/hardware system configuration files, hardware/software system log files, and software/hardware system data files.

6. The method of claim 1, wherein said operational requirements are comprised by structured data files.

7. The method of claim 1, wherein said operational requirements are comprised by unstructured data files.

8. The method of claim 1, further comprising:
    aligning, by said processor, a configuration of said software application with said application compliance requirements.

9. The method of claim 1, wherein said compliance framework comprises a cloud environment.

10. The method of claim 1, further comprising:
providing at least one support service for at least one of creating, integrating, hosting, maintaining, and deploying computer-readable code in the hardware device, said code being executed by the computer processor to implement: said receiving said application compliance requirements, said receiving said original configuration files, said generating said modified configuration files, said executing said risk assessment, said enabling, said generating said software application, and said executing said software application.

11. A computer program product, comprising a computer readable hardware storage device storing a computer readable program code, said computer readable program code comprising an algorithm that when executed by a processor of a compliance framework implements a compliance cloud software component deployment improvement method, said method comprising:
receiving from hardware machine sources, by said processor, application compliance requirements associated with operational requirements associated with hardware and software components, wherein said application compliance requirements comprise encryption keys and audit logs associated with implemented hardware and software controls for said hardware and software components;
receiving, by said processor from said hardware and software components, original configuration files associated with a current hardware and software configuration for each hardware and software component of said hardware and software components, wherein said original configuration files are generated based on measurements of said hardware and software components;
generating, by said processor based on said application compliance requirements with respect to said original configuration files, modified configuration files associated with a modified hardware and software configuration for each said hardware and software component;
executing, by said processor, a risk assessment with respect to said application compliance requirements, said risk assessment associated with applying said modified configuration files to each said hardware and software component;
evaluating, by said processor, a workload of each said hardware and software component at a specified point in time with respect to regulatory requirements;
enabling, by said processor based on results of said executing and said evaluating, a specified cloud infrastructure stack comprising a group of software components associated with executing said application compliance requirements within a specified operational risk threshold of said risk assessment;
generating, by said processor, a software application comprising said specified cloud infrastructure stack;
deploying, by said processor to said hardware and software components, said software application, data encryption software, and an external firewall;
executing, by said processor, said software application, said data encryption software, and said external firewall resulting in execution of decryption keys enabling operation of said hardware and software components;
executing, by said processor, a gap analysis with respect to said operation of said hardware and software components; and
enabling, by said processor based on results of said executing said gap analysis, said specified cloud infrastructure stack with respect to a specified level of compliance.

12. The computer program product of claim 11, wherein said specified cloud infrastructure stack comprises a modified cloud infrastructure stack associated with said hardware and software components, and wherein said executing said data encryption software, said external firewall, and said software application comprising said specified cloud infrastructure stack comprises:
applying said modified configuration files to each said hardware and software component; and
updating each said hardware and software component in accordance with said modified configuration files.

13. The computer program product of claim 11, wherein said specified cloud infrastructure stack comprises an original cloud infrastructure stack associated with said hardware and software components, and wherein said executing said data encryption software, said external firewall, and said software application comprising said specified cloud infrastructure stack comprises:
reconfiguring each said hardware and software component in accordance with said original configuration files.

14. The computer program product of claim 11, wherein said method further comprises:
weighting, by said processor, said application compliance requirements such that specified critical requirements of said application compliance requirements are continuously executed within said software application.

15. The computer program product of claim 11, wherein said hardware machine sources comprise hardware devices generating system software selected from the group consisting of software/hardware system configuration files, hardware/software system log files, and software/hardware system data files.

16. The computer program product of claim 11, wherein said operational requirements are comprised by structured data files.

17. The computer program product of claim 11, wherein said operational requirements are comprised by unstructured data files.

18. The computer program product of claim 11, wherein said method further comprises:
aligning, by said processor, a configuration of said software application with said application compliance requirements.

19. A compliance framework comprising a hardware processor coupled to a computer-readable memory unit, said memory unit comprising instructions that when executed by the processor implements a compliance cloud software component deployment improvement method comprising:
receiving from hardware machine sources, by said hardware processor, application compliance requirements associated with operational requirements associated with hardware and software components, wherein said application compliance requirements comprise encryption keys and audit logs associated with implemented hardware and software controls for said hardware and software components;
receiving, by said hardware processor from said hardware and software components, original configuration files associated with a current hardware and software configuration for each hardware and software component of said hardware and software components, wherein said original configuration files are generated based on measurements of said hardware and software components;

generating, by said hardware processor based on said application compliance requirements with respect to said original configuration files, modified configuration files associated with a modified hardware and software configuration for each said hardware and software component;

executing, by said hardware processor, a risk assessment with respect to said application compliance requirements, said risk assessment associated with applying said modified configuration files to each said hardware and software component;

evaluating, by said hardware processor, a workload of each said hardware and software component at a specified point in time with respect to regulatory requirements;

enabling, by said hardware processor based on results of said executing and said evaluating, a specified cloud infrastructure stack comprising a group of software components associated with executing said application compliance requirements within a specified operational risk threshold of said risk assessment;

generating, by said hardware processor, a software application comprising said specified cloud infrastructure stack;

deploying, by said hardware processor to said hardware and software components, said software application, data encryption software, and an external firewall;

executing, by said hardware processor, said software application, said data encryption software, and said external firewall resulting in execution of decryption keys enabling operation of said hardware and software components;

executing, by said hardware processor, a gap analysis with respect to said operation of said hardware and software components; and enabling, by said hardware processor based on results of said executing said gap analysis, said specified cloud infrastructure stack with respect to a specified level of compliance.

20. The compliance framework of claim 19, wherein said specified cloud infrastructure stack comprises a modified cloud infrastructure stack associated with said hardware and software components, and wherein said executing said data encryption software, said external firewall, and said software application comprising said specified cloud infrastructure stack comprises:

applying said modified configuration files to each said hardware and software component; and updating each said hardware and software component in accordance with said modified configuration files.

* * * * *